United States Patent
Han et al.

(10) Patent No.: US 11,961,961 B2
(45) Date of Patent: Apr. 16, 2024

(54) SECONDARY BATTERY AND APPARATUS CONTAINING THE SAME

(71) Applicant: Contemporary Amperex Technology Co., Limited, Ningde (CN)

(72) Inventors: Changlong Han, Ningde (CN); Zeli Wu, Ningde (CN); Chenghua Fu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/730,247

(22) Filed: Apr. 27, 2022

(65) Prior Publication Data

US 2022/0255123 A1 Aug. 11, 2022

Related U.S. Application Data

(63) Continuation of application No. PCT/CN2019/127982, filed on Dec. 24, 2019.

(51) Int. Cl.
| | |
|---|---|
| H01M 10/0525 | (2010.01) |
| H01M 4/04 | (2006.01) |
| H01M 4/36 | (2006.01) |
| H01M 4/525 | (2010.01) |
| H01M 4/583 | (2010.01) |
| H01M 10/0567 | (2010.01) |
| H01M 4/02 | (2006.01) |

(52) U.S. Cl.
CPC ..... *H01M 10/0525* (2013.01); *H01M 4/0404* (2013.01); *H01M 4/366* (2013.01); *H01M 4/525* (2013.01); *H01M 4/583* (2013.01); *H01M 10/0567* (2013.01); *H01M 2004/027* (2013.01); *H01M 2004/028* (2013.01); *H01M 2220/30* (2013.01); *H01M 2300/002* (2013.01)

(58) Field of Classification Search
None
See application file for complete search history.

(56) References Cited

U.S. PATENT DOCUMENTS

| | | | |
|---|---|---|---|
| 2013/0177799 A1 | 7/2013 | Ihara et al. | |
| 2015/0125741 A1 | 5/2015 | Odani et al. | |

FOREIGN PATENT DOCUMENTS

| | | | |
|---|---|---|---|
| CN | 102356499 A | 2/2012 | |
| CN | 102694161 A | 9/2012 | |
| CN | 103178291 A | 6/2013 | |
| CN | 102637894 B | 11/2014 | |
| CN | 105186032 A | 12/2015 | |
| CN | 105789684 A | 7/2016 | |
| CN | 105826608 A | 8/2016 | |
| CN | 106099171 A | 11/2016 | |
| CN | 104332655 B | 10/2017 | |
| CN | 107403959 A | 11/2017 | |
| CN | 107851847 A | 3/2018 | |
| CN | 107871889 A | 4/2018 | |
| CN | 108242556 A | 7/2018 | |
| CN | 110061176 A | 7/2019 | |
| EP | 3333962 A1 | 6/2018 | |
| JP | 2010225522 A | 10/2010 | |
| JP | 2012199172 A | 10/2012 | |
| JP | 2013134859 A | 7/2013 | |
| WO | 2016056361 A1 | 4/2016 | |
| WO | WO-2018179526 A1 * | 10/2018 | ........ H01M 10/0525 |

OTHER PUBLICATIONS

Rassmus Andersson, Silicon-based graphite electrodes for Li-ion batteries, Uppsala Unviversitet, May 2018.*
The First Office Action for India Application No. 202227024343, dated Aug. 25, 2022, 5 pages.
The extended European search report for European Application No. 19957739.6, dated Sep. 12, 2022, 8 pages.
The First Office Action for JP Application No. 2022-520407, dated May 9, 2023, 4 pages.
The International search report for PCT Application No. PCT/CN2019/127982, dated Sep. 24, 2020, 10 pages.
The First Office Action and search report dated Sep. 13, 2023 for Chinese Application No. 201980098797.4, 13 pages.

\* cited by examiner

*Primary Examiner* — Carlos Barcena
(74) *Attorney, Agent, or Firm* — East IP P.C.

(57) ABSTRACT

The present application provides a secondary battery and an apparatus containing the same. The secondary battery includes: a negative electrode plate including a negative electrode current collector and a negative electrode film disposed on at least one surface of the negative electrode current collector, the negative electrode film including a negative active material; and an electrolyte including an electrolyte salt, an organic solvent, and an additive; wherein the negative active material includes a silicon-based material; the additive includes an additive A and an additive B; the additive A is selected from one or more of the compounds shown in Formula 1; the additive B is selected from one or more in the compound shown in Formula 2; the additive B has melting point of below or equal to 5° C.

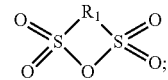

Formula 1

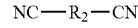

Formula 2

13 Claims, 2 Drawing Sheets

SECONDARY BATTERY AND APPARATUS CONTAINING THE SAME

CROSS-REFERENCE TO RELATED APPLICATIONS

This application is a continuation of International Application No. PCT/CN2019/127982, filed on Dec. 24, 2019, entitled "SECONDARY BATTERY AND APPARATUS CONTAINING THE SAME", which is incorporated herein by reference in its entirety.

TECHNICAL FIELD

The application relates to the technical field of batteries, in particular to a secondary battery and an apparatus containing the same.

BACKGROUND

In the rapidly developing information age, people's demand for electronic products such as mobile phones, notebooks, and cameras has increased year by year. As the working power supply of electronic products, secondary batteries with high energy density, no memory effect and high working voltage, are gradually replacing traditional Ni—Cd and MH—Ni batteries. However, with the expansion of the market demand of electronic products and the development of power and energy storage equipment, people's requirements for secondary batteries are constantly increasing, and the development of secondary batteries with high energy density has become a top priority. The use of silicon-based materials with high specific capacity as the negative active material of secondary batteries can effectively improve the energy density of secondary batteries, but the electrochemical performance of batteries using silicon-based materials is often poor.

Therefore, it is urgent to develop a secondary battery with high energy density and good electrochemical performance at the same time.

SUMMARY

In view of the problems existing in the background, the purpose of the present application is to provide a secondary battery and an apparatus containing the secondary battery, which can have better high-temperature cycle performance, high-temperature storage performance and low-temperature discharge performance at the same time.

In order to achieve the above object, in one aspect of the present application, a secondary battery is provided, including: a negative electrode plate including a negative electrode current collector and a negative electrode film disposed on at least one surface of the negative electrode current collector, the negative electrode film including a negative active material; an electrolyte including an electrolyte salt, an organic solvent and an additive; wherein the negative active material includes a silicon-based material; the additive includes an additive A and an additive B; the additive A is selected from one or more of the compounds shown in Formula 1;

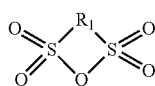

Formula 1 in which $R_1$ is selected from one or more of C2-C4 alkylene, C2-C4 halogenated alkylene, C2-C4 alkenylene, C2-C4 halogenated alkenylene, C6-C18 arylene and C6-C18 halogenated arylene;

the additive B is selected from one or more in the compound shown in Formula 2;

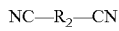

Formula 2 in which $R_2$ is selected from one or more of C1-C20 alkylene, C1-C20 halogenated alkylene, C1-C20 alkyleneoxy group, C1-C20 halogenated alkyleneoxy, C1-C20 alkylene group and C1-C20 halogenated alkenylene;

the additive B has melting point of below or equal to 5° C.

A second aspect of the present application provides an apparatus, containing the secondary battery according to the first aspect of the present application.

The present application at least has the following beneficial effects:

In the secondary battery of the present application, the negative electrode plate includes a silicon-based material, and the electrolyte includes both additive A and additive B, and the melting point of additive B is below or equal to 5° C. Under the combined action of these factors, the secondary battery can have good high-temperature cycle performance, high-temperature storage performance and low-temperature discharge performance at the same time. The apparatus of the present application includes the secondary battery, and thus has at least the same advantages as the secondary battery.

Figure 1:
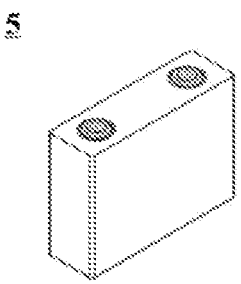
FIG. 1 is a schematic diagram of a secondary battery provided by an embodiment of the present application.

Among them, the reference signs are explained as follows:
1. Battery pack;
2. Upper case body;
3. Lower case body;
4. Battery module;
5. Secondary battery.

DETAILED DESCRIPTION

A secondary battery and an apparatus including the same according to the application are described in detail below.

First, the secondary battery according to the first aspect of the present application will be explained.

The secondary battery according to the first aspect of the present application comprises a negative electrode plate and an electrolyte; the negative electrode plate comprises a negative electrode current collector and a negative electrode film disposed on at least one surface of the negative electrode current collector, the negative electrode film comprising a negative active material; the negative active material comprises a silicon-based material; the electrolyte comprises an electrolyte salt, an organic solvent, and an additive;

the additive comprises an additive A and an additive B, and the additive A is selected from one or more of the compounds shown in Formula 1,

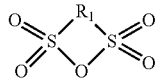

Formula 1 in which $R_1$ is selected from one or more of C2-C4 alkylene, C2-C4 halogenated alkylene, C2-C4 alkenylene, C2-C4 halogenated alkenylene, C6-C18 arylene and C6-C18 halogenated arylene; the additive B is selected from one or more in the compound shown in Formula 2;

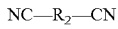

Formula 2 in which $R_2$ is selected from one or more of C1-C20 alkylene, C1-C20 halogenated alkylene, C1-C20 alkyleneoxy group, C1-C20 halogenated alkyleneoxy, C1-C20 alkylene group and C1-C20 halogenated alkenylene; the additive B has melting point of below or equal to 5° C.

Preferably, the halogen can be selected from one or more of F, Cl, Br, and I.

The inventors have found that the additive shown in Formula 1 can form a dense and uniform passivation film on the surface of the silicon-based material, which can effectively prevent the direct contact between the electrolyte solvent and the silicon-based material, and reduce the side reaction of the electrolyte solvent on the surface of the negative electrode, thereby reducing the gas production of the secondary battery and improving the high-temperature storage performance of the secondary battery. However, the film-forming resistance of the passivation film formed by the additive shown in Formula 1 on the surface of the negative electrode is relatively large, which affects the cycle performance of the battery. The inventors have found through extensive research that when the electrolyte further comprises additive B, the film-forming resistance on the surface of the negative electrode can be reduced, and the low-temperature discharge performance of the secondary battery can be effectively improved.

In the secondary battery according to the first aspect of the present application, preferably, the additive A is selected from one or more of the following compounds:

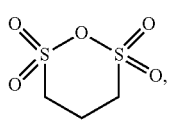

Compound 1-1

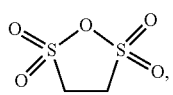

Compound 1-2

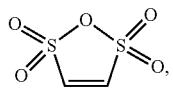

Compound 1-3

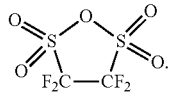

Compound 1-4

In the secondary battery according to the first aspect of the present application, preferably, the additive B is selected from one or more of adiponitrile, glutaronitrile, 2-methylglutaronitrile, 1,2-bis(2-cyanoethoxy)ethane, 1,4-bis(2-cyanoethoxy)butane; more preferably, the additive B is selected from one or more of adiponitrile, 1,2-bis(2-cyanoethoxy) ethane.

In the secondary battery according to the first aspect of the present application, preferably, the mass proportion of the additive A in the electrolyte is ≤2%. If the content of additive A is too high, it will lead to an increase in the film-forming resistance on the surface of the negative electrode and deteriorate the low-temperature performance of the secondary battery. Preferably, the mass proportion of the additive A in the electrolyte is from 0.1% to 1%.

In the secondary battery according to the first aspect of the present application, preferably, the mass proportion of the additive B in the electrolyte is ≤5%. If the content of additive B is too high, too much additive B will inevitably form a film on the surface of the negative electrode, thereby deteriorating the high-temperature cycle performance of the secondary battery. Preferably, the content of the additive B is 0.5% to 3% based on the total weight of the electrolyte.

In the secondary battery according to the first aspect of the present application, the additive may further comprise one or more of vinylene carbonate (VC), fluoroethylene carbonate (FEC), 1,3,2-dioxathiolane 2,2-dioxide (DTD), 1,3-propane sultone (PS) and 1,3-propene sultone (PST).

In the secondary battery according to the first aspect of the present application, the type of the organic solvent is not particularly limited, and can be selected according to actual needs. Specifically, the organic solvent may be selected from one or more of chain esters and cyclic esters. Preferably, the chain ester can be selected from one or more of dimethyl carbonate, diethyl carbonate, ethyl methyl carbonate, methyl propyl carbonate, methyl formate, ethyl formate, methyl acetate, ethyl acetate, propyl propionate, ethyl butyrate, ethyl propionate, and propyl butyrate; the cyclic ester can be selected from one or more of ethylene carbonate, propylene carbonate, butylene carbonate, γ-butyrolactone, and tetrahydrofuran.

In the secondary battery according to the first aspect of the present application, the type of the electrolyte salt is not particularly limited, and can be selected according to actual needs. Specifically, the electrolyte salt can be selected from one or more of $LiPF_6$, $LiBF_4$, LiFSI, LiTFSI, $LiClO_4$, $LiAsF_6$, LiBOB, LiDFOB, $LiPO_2F_2$, LiTFOP, $LiN(SO_2RF)_2$, $LiN(SO_2F)(SO_2RF)$, in which $RF=C_nF_{2n+1}$, representing a saturated perfluoroalkyl group, and n is an integer in the range of 1 to 10.

In the secondary battery according to the first aspect of the present application, the content of the electrolyte salt is not particularly limited, and can be selected according to actual needs. Preferably, the content of the electrolyte salt is 6% to 25% based on the total weight of the electrolyte; more preferably, the content of the electrolyte salt is 6% to 20% based on the total weight of the electrolyte.

In the secondary battery according to the first aspect of the application, the secondary battery further comprises a positive electrode plate, wherein the positive electrode plate comprises a positive electrode current collector and a positive electrode film disposed on at least one surface of the positive electrode current collector, the positive electrode film comprising a positive active material. Preferably, the positive active material comprises one or more of lithium cobalt oxide, lithium nickel oxide, lithium manganese oxide, lithium nickel manganese oxide, lithium nickel cobalt manganese oxide, lithium nickel cobalt aluminum oxide, transition metal phosphate, etc.; more preferably, the positive active material comprises one or more of lithium cobalt oxide (for example, lithium cobaltate). When the positive active material comprises lithium cobalt oxide, the improvement effect of the electrolyte of the present application on the battery performance is more obvious.

In the secondary battery according to the first aspect of the present application, the type of the positive electrode current collector is not particularly limited, and can be selected according to specific requirements. Specifically, the positive electrode current collector may be selected from metal foils, for example, the positive electrode current collector may be selected from aluminum foils.

In the secondary battery according to the first aspect of the present application, the type of the negative electrode current collector is not particularly limited, and can be selected according to specific requirements. Specifically, the negative electrode current collector may be selected from metal foils, for example, the positive electrode current collector may be selected from copper foils.

In the secondary battery according to the first aspect of the present application, preferably, the silicon-based material comprises one or more of elemental silicon, silicon-oxygen compound, silicon-carbon composite, silicon-nitrogen composite, and silicon alloy; more preferably, the silicon-based material comprises a silicon-oxygen compound.

In the secondary battery according to the first aspect of the present application, preferably, the negative active material further comprises one or more of natural graphite, artificial graphite, soft carbon, and hard carbon; more preferably, the negative active material further comprises one or more of natural graphite and artificial graphite.

In the secondary battery according to the first aspect of the present application, the secondary battery further comprises a separator. The type of the separator is not particularly limited, and it may be various separators suitable for secondary batteries in the art. Specifically, the separator can be selected from one or more of polyethylene films, polypropylene films, polyvinylidene fluoride films and the multi-layer composite films thereof.

In some embodiments, the secondary battery may comprise an outer package used for packaging the positive electrode plate, the negative electrode plate and the electrolyte. As an example, the positive electrode plate, the negative electrode plate and the separator can be laminated or wound to be a laminated electrode assembly or a wound electrode assembly that is packaged in the outer package; and the electrolyte is infiltrated into the electrode assembly. The number of the electrode assemblies in the secondary battery can be one or more, and can be adjusted as needed.

In some embodiments, the outer packaging of the secondary battery may be a soft bag, such as a bag-type soft bag. The material of the soft bag can be plastic, such as one or more of polypropylene (PP), polybutylene terephthalate (PBT), polybutylene succinate (PBS). The outer packaging of the battery may also be a hard case, such as an aluminum case.

The present application does not particularly limit the shape of the secondary battery, which can be cylindrical, square or other arbitrary shapes. FIG. 1 shows a secondary battery 5 with a square structure as an example.

In some embodiments, the secondary battery can be assembled into a battery module, and the number of secondary batteries contained in the battery module can be multiple, and the specific number can be adjusted according to the application and capacity of the battery module.

Figure 2:
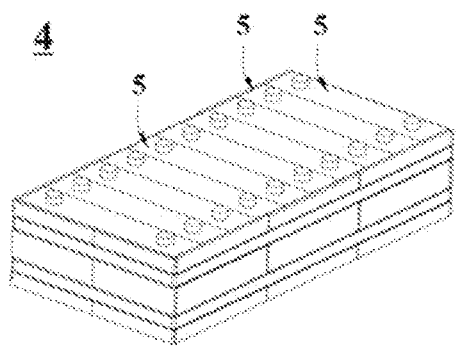
FIG. 2 is a schematic diagram of a battery module provided by an embodiment of the present application.

FIG. 2 shows a battery module 4 as an example. Referring to FIG. 2, in the battery module 4, a plurality of secondary batteries 5 may be disposed sequentially in the length direction of the battery module 4. Of course, the secondary batteries 5 may also be disposed in any other manner. Furthermore, the plurality of secondary batteries 5 may be fixed by fasteners.

Optionally, the battery module 4 may further comprise a housing with a receiving space, and the plurality of secondary batteries 5 are received in the receiving space.

In some embodiments, the above-mentioned battery module may also be assembled into a battery pack, and the number of battery modules contained in the battery pack can be adjusted according to the application and capacity of the battery pack.

Figure 3:
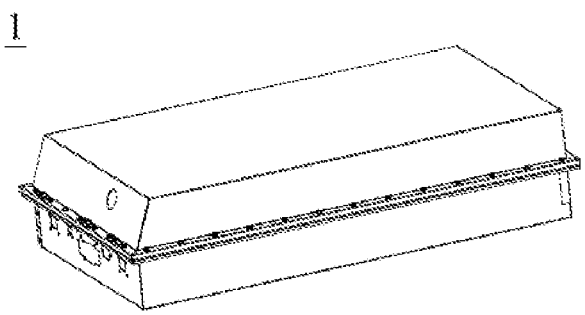
FIG. 3 is a schematic diagram of a battery pack provided by an embodiment of the present application.
Figure 4:
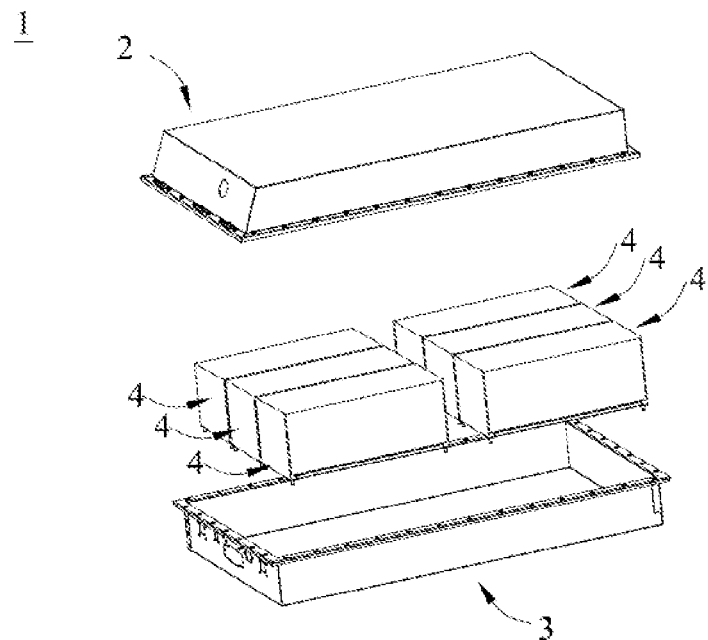
FIG. 4 is an exploded view of the battery pack in FIG. 3.

FIGS. 3 and 4 show a battery pack 1 as an example. Referring to FIGS. 3 and 4, the battery pack 1 may comprise a battery case and a plurality of battery modules 4 disposed in the battery case. The battery case comprises an upper case body 2 and a lower case body 3.

The upper case body 2 can cover the lower case body 3 to form a closed space for receiving the battery modules 4. A plurality of battery modules 4 can be disposed in the battery case in any manner.

Next, an apparatus according to the second aspect of the present application is described.

The apparatus according to the second aspect of the present application comprises the secondary battery according to the first aspect of the present application, and the secondary battery can be used as a power source of the apparatus or as an energy storage unit of the apparatus. Preferably, the apparatus comprises, but is not limited to, a mobile apparatus (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The apparatus may comprise the secondary battery, the battery module or the battery pack selected according to its usage requirements.

Figure 5:
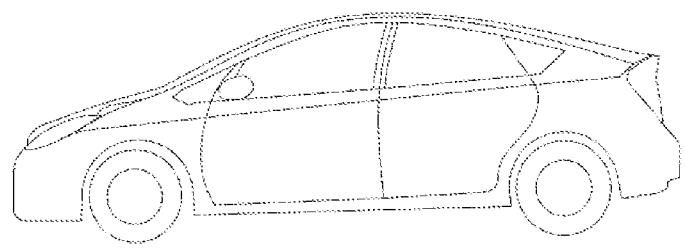
FIG. 5 is a schematic diagram of an apparatus provided by an embodiment of the present application, for which a secondary battery is used as a power source.

FIG. 5 shows an apparatus as an example. The apparatus is a pure electric vehicle, a hybrid electric vehicle, or a plug-in hybrid electric vehicle. In order to meet the requirements of the apparatus for high power and high energy density of secondary batteries, the battery pack or battery module can be used.

As another example, the apparatus may be a mobile phone, a tablet computer, a notebook computer, etc. The apparatus is generally required to be thin and light, and the secondary battery can be used as a power supply.

The present application is further described below with reference to the embodiments. It should be appreciated that these embodiments are merely used for illustrating the present application, but are not intended to limit the scope of the present application.

Exemplary Embodiments

Embodiment 1. A secondary battery comprising:
a negative electrode plate comprising a negative electrode current collector and a negative electrode film disposed on at least one surface of the negative electrode current collector, the negative electrode film comprising a negative active material; and
an electrolyte comprising an electrolyte salt, an organic solvent, and an additive;

wherein the negative active material comprises a silicon-based material;

the additive comprises an additive A and an additive B; and the additive A is selected from one or more of the compounds shown in Formula 1,

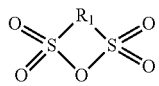

Formula 1 in which $R_1$ is selected from one or more of C2-C4 alkylene, C2-C4 halogenated alkylene, C2-C4 alkenylene, C2-C4 halogenated alkenylene, C6-C18 arylene and C6-C18 halogenated arylene; the additive B is selected from one or more in the compound shown in Formula 2;

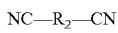

Formula 2 in which $R_2$ is selected from one or more of C1-C20 alkylene, C1-C20 halogenated alkylene, C1-C20 alkyleneoxy group, C1-C20 halogenated alkyleneoxy, C1-C20 alkylene group and C1-C20 halogenated alkenylene;

the additive B has melting point of below or equal to 5° C.

Embodiment 2. The secondary battery of embodiment 1, wherein the additive A is selected from one or more of the following compounds:

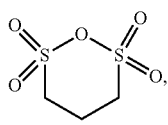

Compound 1-1

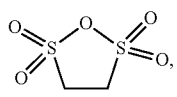

Compound 1-2

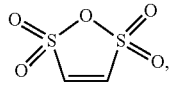

Compound 1-3

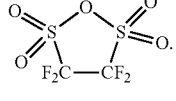

Compound 1-4

Embodiment 3. The secondary battery of embodiment 1 or 2, wherein the additive B is selected from one or more of adiponitrile, glutaronitrile, 2-methylglutaronitrile, 1,2-bis(2-cyanoethoxy)ethane, 1,4-bis(2-cyanoethoxy)butane; more preferably, the additive B is selected from one or more of adiponitrile, 1,2-bis(2-cyanoethoxy)ethane.

Embodiment 4. The secondary battery of any one of embodiments 1 to 3, wherein a mass proportion of the additive A in the electrolyte is ≤2%, preferably, the mass proportion of the additive A in the electrolyte is from 0.1% to 1%.

Embodiment 5. The secondary battery of any one of embodiments 1 to 4, wherein a mass proportion of the additive B in the electrolyte is ≤5%, preferably, the mass proportion of the additive B in the electrolyte is from 0.5% to 3%.

Embodiment 6. The secondary battery of any one of embodiments 1 to 5, wherein the additive further comprises one or more of vinylene carbonate (VC), fluoroethylene carbonate (FEC), 1,3,2-dioxathiolane 2,2-dioxide (DTD), 1,3-propane sultone (PS) and 1,3-propene sultone (PST).

Embodiment 7. The secondary battery of any one of embodiments 1 to 6, wherein the secondary battery further comprises a positive electrode plate, and the positive electrode plate comprises a positive electrode current collector and a positive electrode film disposed on at least one surface of the positive electrode current collector, positive electrode film comprising a positive active material; the positive active material comprises one or more of lithium cobalt oxide, lithium nickel oxide, lithium manganese oxide, lithium nickel manganese oxide, lithium nickel cobalt manganese oxide, lithium nickel cobalt aluminum oxide, transition metal phosphate; preferably, the positive active material comprises lithium cobalt oxide.

Embodiment 8. The secondary battery of any one of embodiments 1 to 7, wherein the silicon-based material comprises one or more of elemental silicon, silicon-oxygen compound, silicon-carbon composite, silicon-nitrogen composite, and silicon alloy; preferably, the silicon-based material comprises a silicon-oxygen compound.

Embodiment 9. The secondary battery of any one of embodiments 1 to 8, wherein the negative active material further comprises a carbon material selected from one or more of natural graphite, artificial graphite, soft carbon, and hard carbon; preferably, a carbon material selected from one or more of natural graphite and artificial graphite.

Embodiment 10. An apparatus containing the secondary battery of any one of embodiments 1 to 9.

The secondary batteries in embodiments 1-17 and comparative examples 1-4 are prepared according to the following method:

(1) Preparation of Positive Electrode Plate

A positive active material (LiCoO$_2$), a binder (polyvinylidene fluoride) and a conductive agent (Super P) were mixed in a weight ratio of 98:1:1, then N-methylpyrrolidone (NMP) was added, and stirred under action of a vacuum mixer until the system was transparent, so as to obtain a positive electrode slurry; the positive electrode slurry was applied on an aluminum foil as a positive electrode collector uniformly; and the aluminum foil was dried at room temperature and then transferred to an oven to dry, and then cold-pressed and cut to obtain a positive electrode plate.

(2) Preparation of Negative Electrode Plate

The negative active material (silicon monoxide: artificial graphite=1:9) was mixed, and then mixed with the conductive agent Super P and the binder acrylate in a mass ratio of 92:2:6, then the deionized water was added, and stirred under action of a vacuum mixer to obtain a negative electrode slurry; the negative electrode slurry was applied on a copper foil as a negative electrode collector uniformly; and the copper foil was dried at room temperature and then transferred to an oven to dry, and then cold-pressed and cut to obtain a negative electrode plate.

(3) Preparation of Electrolyte

In an argon glove box with a moisture content of <10 ppm, ethylene carbonate (EC), propylene carbonate (PC) and diethyl carbonate (DEC) were mixed in a weight ratio of EC:PC:DEC=1:1:1, to obtain a non-aqueous organic solvent, then the fully dried electrolyte salt LiPF$_6$ was dissolved in the non-aqueous organic solvent, and the additive FEC was added to the non-aqueous organic solvent, and mixed uniformly to obtain an electrolyte. The content of LiPF$_6$ was 12.5% based on the total weight of the electrolyte. The types, characteristic parameters and contents of additives were shown in Table 1. In Table 1, the content of the additive was the weight percentage calculated based on the total weight of the electrolyte.

(4) Preparation of Separator

A polyethylene membrane was used as a separator.

(5) Preparation of Secondary Battery

The positive electrode plate, the separator, and the negative electrode plate were stacked in order, so that the separator was located between the positive electrode plate and the negative electrode plate for isolation. After winding, a bare battery core was obtained. The bare battery core was put into the outer packaging, in which the above-mentioned electrolyte was then added, and after encapsulation, standing, formation, and aging, a secondary battery was obtained.

TABLE 1

Parameters of Embodiments 1-17 and Comparative Examples 1-4

| | Additive A | | Additive B | | |
|---|---|---|---|---|---|
| No. | Type | Content/% | Type | Melting point/° C. | Content/% |
| Example 1 | Compound 1-1 | 0.01% | adiponitrile | 2.3° C. | 3% |
| Example 2 | Compound 1-1 | 0.05% | adiponitrile | 2.3° C. | 3% |
| Example 3 | Compound 1-1 | 0.1% | adiponitrile | 2.3° C. | 3% |
| Example 4 | Compound 1-1 | 0.5% | adiponitrile | 2.3° C. | 3% |
| Example 5 | Compound 1-1 | 1% | adiponitrile | 2.3° C. | 3% |
| Example 6 | Compound 1-1 | 2% | adiponitrile | 2.3° C. | 3% |
| Example 7 | Compound 1-1 | 3% | adiponitrile | 2.3° C. | 3% |
| Example 8 | Compound 1-1 | 0.5% | adiponitrile | 2.3° C. | 0.05% |
| Example 9 | Compound 1-1 | 0.5% | adiponitrile | 2.3° C. | 0.5% |
| Example 10 | Compound 1-1 | 0.5% | adiponitrile | 2.3° C. | 1% |
| Example 11 | Compound 1-1 | 0.5% | adiponitrile | 2.3° C. | 2% |
| Example 12 | Compound 1-1 | 0.5% | adiponitrile | 2.3° C. | 5% |
| Example 13 | Compound 1-1 | 0.5% | adiponitrile | 2.3° C. | 7% |
| Example 14 | Compound 1-2 | 0.5% | adiponitrile | 2.3° C. | 3% |
| Example 15 | Compound 1-3 | 0.5% | adiponitrile | 2.3° C. | 3% |
| Example 16 | Compound 1-4 | 0.5% | adiponitrile | 2.3° C. | 3% |
| Example 17 | Compound 1-1 | 0.5% | 1,2-bis(2-nitrileethoxy)ethane | 1.1° C. | 3% |
| Comparative Example 1 | Compound 1-1 | 0.5% | — | — | — |
| Comparative Example 2 | — | — | adiponitrile | 2.3° C. | 3% |
| Comparative Example 3 | Compound 1-1 | 0.5% | succinonitrile | 57.15° C. | 3% |
| Comparative Example 4 | Compound 1-1 | 0.5% | butyronitrile | −112.6° C. | 3% |

Next, the test procedure of the secondary battery was explained.

(1) High-Temperature Storage Performance of Secondary Battery

At 60° C., the secondary battery was charged to 4.3V with a constant current of 0.5 C, and then charged to a current of 0.05 C with a constant voltage of 4.3V. The volume of the secondary battery at this time was measured by the drainage method and recorded as $V_1$; then the secondary battery was placed in a constant-temperature box at 60° C., and taken out after being stored for 30 days, and the volume of the secondary battery at this time was measured and recorded as $V_2$.

Volume expansion rate (%) of the secondary battery after storage at 60° C. for 30 days=$[(V_2-V_1)/V_1]\times 100\%$.

(2) High-Temperature Cycle Performance of Secondary Battery

At 45° C., the secondary battery was charged with a constant current of 1 C to 4.3V, then charged with a constant voltage of 4.3V to a current of 0.05 C, standing for 5 minutes, and then discharged with a constant current of 1 C to 2.8V. This was the first charge-discharge cycle of the secondary battery, and the resulting discharge capacity was recorded as the discharge capacity of the secondary battery at the first cycle. The secondary battery was charged and discharged for 800 cycles according to the above procedure, and the discharge capacity of the secondary battery after 800 cycles was recorded.

The capacity retention rate (%) of the secondary battery after 800 cycles at 45° C.=(discharge capacity of the secondary battery after 800 cycles/discharge capacity of the secondary battery at the first cycle)×100%.

(3) Low-Temperature Discharge Performance of Secondary Battery

At 25° C., the secondary battery was charged with a constant current of 1 C (nominal capacity) to 4.3V, then charged with a constant voltage of 4.3V to a current of 0.05 C, standing for 5 minutes, and then discharged with a constant current of 1 C to a cut-off voltage of 2.8 V, and the actual discharge capacity of the secondary battery at this time was measured and recorded as do.

At 25° C., the secondary battery was charged with a constant current of 1 C (nominal capacity) to 4.3V, and then charged with a constant voltage to a current of 0.05 C, standing for 5 minutes, and then standing at −10° C. for more than 4 hours, so that the temperature of the secondary battery reached −10° C., after which the secondary battery was discharged with a constant current of 0.5 C to a cut-off voltage of 2.8V. The actual discharge capacity of the secondary battery at this time was measured and recorded as $d_1$.

Discharge capacity retention rate (%) of secondary battery at −10° C.=(discharge capacity $d_1$ at −10° C./discharge capacity do at 25° C.)×100%.

TABLE 2

Performance Test Results of Examples 1-17 and Comparative Examples 1-4

| No. | Volume expansion rate (%) after being stored for 30 days at 60° C. | Capacity retention rate after 800 cycles at 45° C | Discharge capacity retention rate at −10° C./% |
|---|---|---|---|
| Example 1 | 17.5 | 81.0 | 87.5 |
| Example 2 | 16.4 | 82.8 | 86.4 |
| Example 3 | 15.9 | 83.3 | 85.0 |
| Example 4 | 12.1 | 89.1 | 84.1 |
| Example 5 | 11.8 | 88.9 | 82.5 |
| Example 6 | 9.2 | 87.5 | 79.5 |
| Example 7 | 8.8 | 83.5 | 78.1 |
| Example 8 | 22.8 | 81.5 | 78.2 |
| Example 9 | 19.9 | 83.5 | 80.5 |
| Example 10 | 16.5 | 87.8 | 82.8 |
| Example 11 | 13.8 | 88.5 | 83.4 |
| Example 12 | 11.1 | 89.0 | 86.1 |
| Example 13 | 10.5 | 80.9 | 85.5 |
| Example 14 | 13.5 | 88.1 | 83.5 |
| Example 15 | 14.1 | 87.5 | 82.9 |
| Example 16 | 13.5 | 86.1 | 81.9 |
| Example 17 | 11.9 | 87.9 | 83.5 |
| Comparative Example 1 | 18.5 | 89.1 | 77.1 |
| Comparative Example 2 | 24.1 | 88.9 | 77.5 |
| Comparative Example 3 | 16.7 | 80.1 | 74.5 |
| Comparative Example 4 | 17.6 | 70.2 | 71.5 |

From the analysis of the test results in Table 2, it can be seen that the secondary batteries of Examples 1-17 of the present application used silicon-based materials as the negative active material, and the electrolyte was added with additive A and additive B having a melting point of below or equal to 5° C. Under the combined action, the secondary battery of the present application had better high-temperature cycle performance, high-temperature storage performance and low-temperature discharge performance at the same time.

No additive B was added to the electrolyte in Comparative Example 1, and the obtained secondary battery had poor high-temperature cycle performance and low-temperature discharge performance.

No additive A was added to the electrolyte in Comparative Example 2, and the obtained secondary battery had poor high-temperature cycle performance and low-temperature discharge performance, and the high-temperature storage performance of the secondary battery deteriorated.

Although the additive B added to the electrolyte in Comparative Example 3 satisfied Formula 2, its melting point was higher than 5° C., and the low-temperature discharge performance of the obtained secondary battery deteriorated.

The additive B added to the electrolyte in Comparative Example 4 did not satisfy Formula 2, and the high-temperature cycle and low-temperature discharge performance of the obtained secondary battery deteriorated.

What is claimed is:

1. A secondary battery comprising:
   a negative electrode plate comprising a negative electrode current collector and a negative electrode film disposed on at least one surface of the negative electrode current collector, the negative electrode film comprising a negative active material; and
   an electrolyte comprising an electrolyte salt, an organic solvent, and an additive;
   wherein
   the negative active material comprises a silicon-based material;
   the additive comprises an additive A and an additive B; and
   the additive A is selected from one or more of the following compounds:

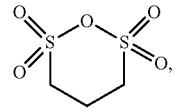

Compound 1-1

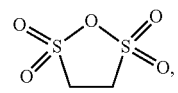

Compound 1-2

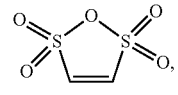

Compound 1-3

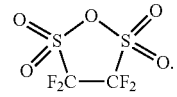

Compound 1-4 the additive B has melting point of below or equal to 5° C.; and
the additive B is selected from 1,2-bis(2-cyanoethoxy)ethane.

2. The secondary battery of claim 1, wherein a mass proportion of the additive A in the electrolyte is ≤2%.

3. The secondary battery of claim 1, wherein a mass proportion of the additive B in the electrolyte is ≤5%.

4. The secondary battery of claim 1, wherein the additive further comprises one or more of vinylene carbonate (VC), fluoroethylene carbonate (FEC), 1,3,2-dioxathiolane 2,2-dioxide (DTD), 1,3-propane sultone (PS) and 1,3-propene sultone (PST).

5. The secondary battery of claim 1, wherein the secondary battery further comprises a positive electrode plate, and the positive electrode plate comprises a positive electrode current collector and a positive electrode film disposed on at least one surface of the positive electrode current collector, positive electrode film comprising a positive active material; the positive active material comprises one or more of lithium cobalt oxide, lithium nickel oxide, lithium manganese oxide, lithium nickel manganese oxide, lithium nickel cobalt manganese oxide, lithium nickel cobalt aluminum oxide, transition metal phosphate.

6. The secondary battery of claim 5, wherein the positive active material comprises lithium cobalt oxide.

7. The secondary battery of claim 1, wherein the silicon-based material comprises one or more of elemental silicon, silicon-oxygen compound, silicon-carbon composite, silicon-nitrogen composite, and silicon alloy.

8. The secondary battery of claim 1, wherein the negative active material further comprises a carbon material selected from one or more of natural graphite, artificial graphite, soft carbon, and hard carbon.

9. The secondary battery of claim 8, wherein the carbon material selected from one or more of natural graphite and artificial graphite.

10. The secondary battery of claim 1, wherein a mass proportion of the additive A in the electrolyte is from 0.1% to 1%.

11. The secondary battery of claim 1, wherein a mass proportion of the additive B in the electrolyte is from 0.5% to 3%.

12. The secondary battery of claim 1, wherein the silicon-based material comprises a silicon-oxygen compound.

13. An apparatus containing the secondary battery of claim 1.

* * * * *